United States Patent [19]
Hull et al.

[11] Patent Number: 5,350,186
[45] Date of Patent: Sep. 27, 1994

[54] TOWLINE REEL ATTACHABLE TO A TRAILER HITCH RECEPTACLE

[76] Inventors: Harold L. Hull, 401 Canyon Way #43, Sparks, Nev. 89434; Dick Hammer, P.O. Box 621, Tahoe City, Calif. 96145; C. Park Bechdolt, P.O. Box 1178, Carnelion Bay, Calif. 96140

[21] Appl. No.: 912,242

[22] Filed: Jul. 13, 1992

[51] Int. Cl.⁵ .................................. B60D 1/18
[52] U.S. Cl. .................. 280/480.1; 280/480; 280/492; 242/379.2
[58] Field of Search ........... 280/415.1, 480, 480.1, 280/492; 242/107.4 R

[56] References Cited

U.S. PATENT DOCUMENTS

| | | | |
|---|---|---|---|
| 1,323,602 | 12/1919 | McNeely | 280/480 |
| 1,537,213 | 5/1925 | Wylie | 280/480 |
| 1,566,740 | 12/1925 | Forrest | 280/480.1 X |
| 1,574,552 | 2/1926 | Chapman | 280/480 |
| 1,587,426 | 6/1926 | Schwier | 280/480 |
| 1,591,686 | 7/1926 | Silva | 280/480 |
| 2,988,384 | 6/1961 | Neff | 280/480 |
| 3,315,642 | 4/1967 | Rogers et al. | 242/107.4 X |
| 3,881,751 | 5/1975 | Colby | 280/480 |
| 4,254,966 | 3/1981 | Mitchell | 280/492 X |
| 4,635,953 | 1/1987 | Robertson et al. | 280/480 |
| 5,072,962 | 12/1991 | Webb | 280/415.1 X |
| 5,167,379 | 12/1992 | Jabusch | 242/107.4 R |

*Primary Examiner*—Margaret A. Focarino
*Assistant Examiner*—Peter English

[57] ABSTRACT

A towline apparatus adapted to be used with a square tubular receiver mounted to a frame of a towing vehicle consisting of a housing which contains a flat coiled spring surrounding a rotatable shaft with the shaft also supporting a flexible, extendable strap which is always in a tensioned position and which can be pulled out of the housing and be attached to an object to be towed. Also, automatic stop means are provided and a locking pin if desired and may also include a hinge in the connection member.

1 Claim, 4 Drawing Sheets

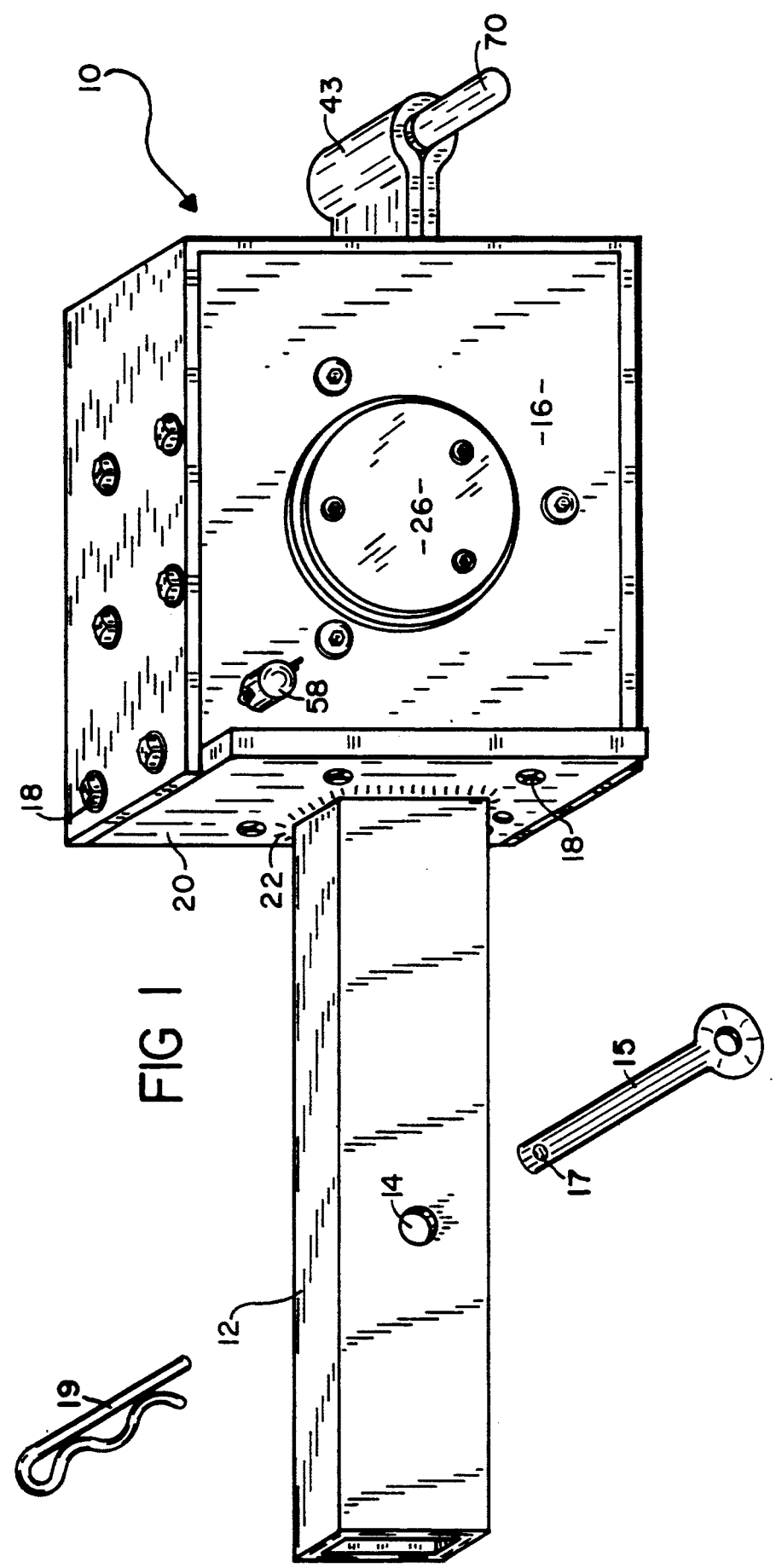

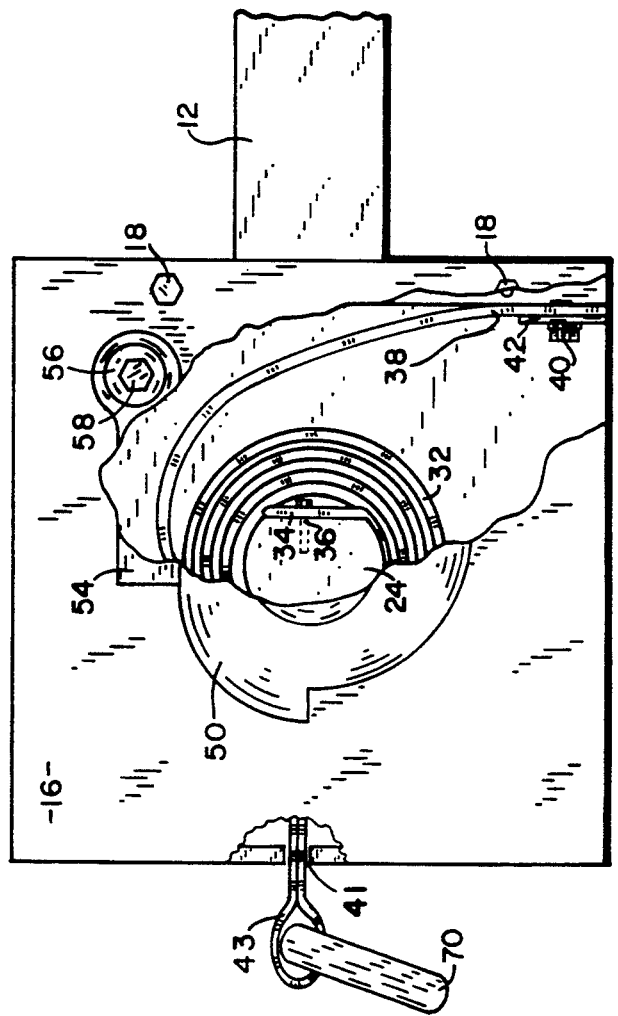
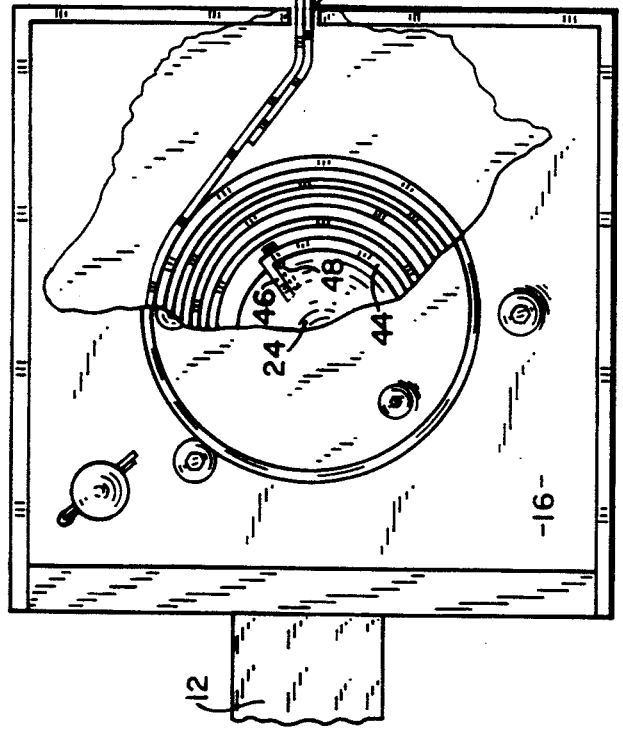

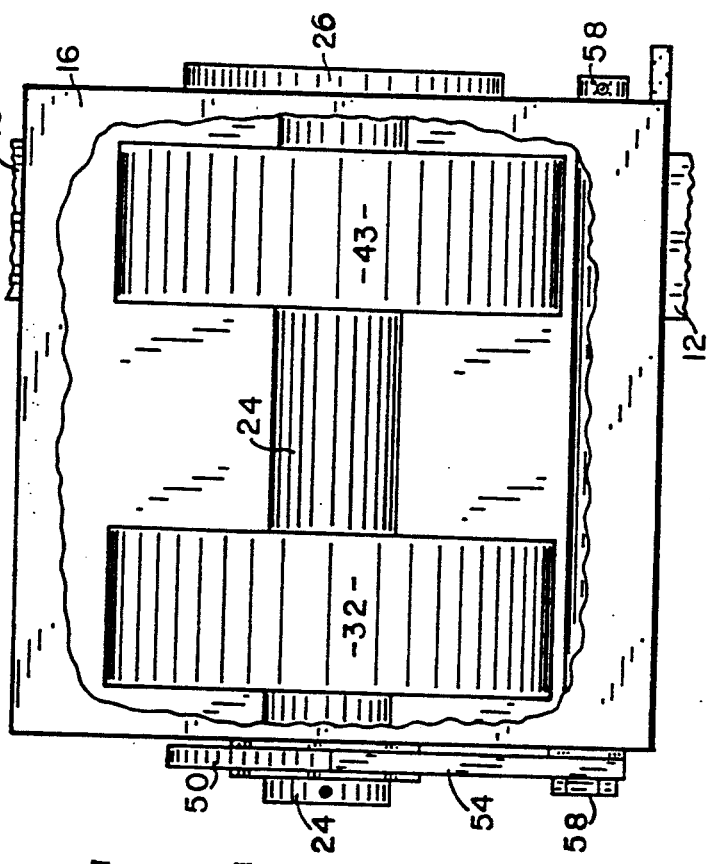
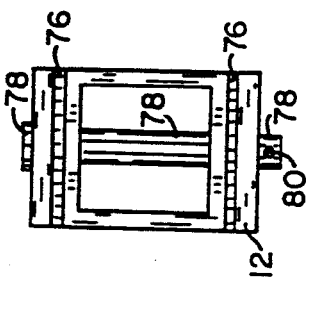
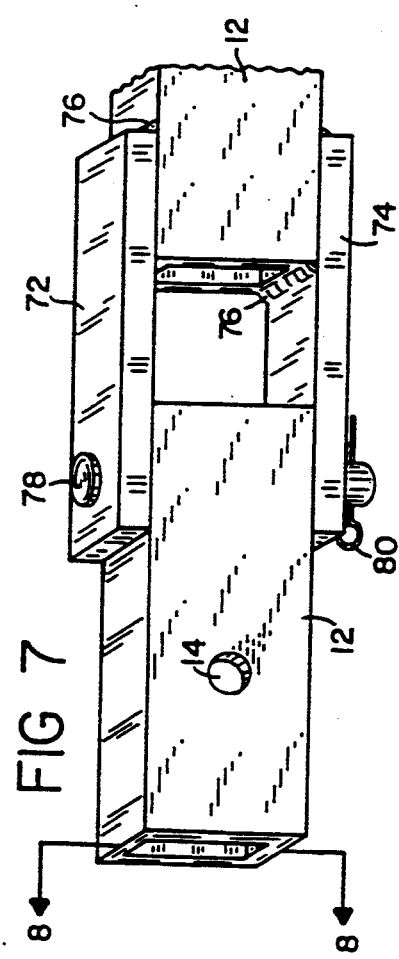
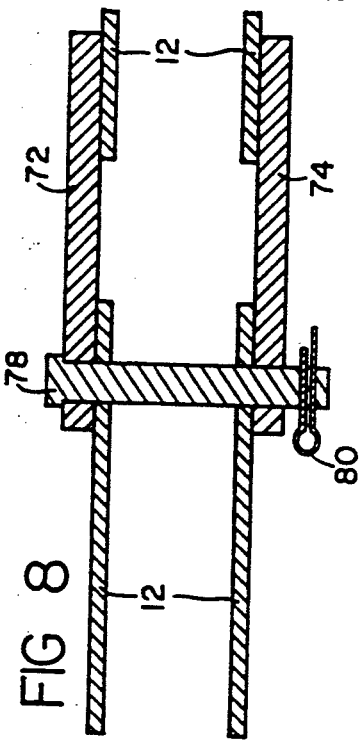

TOWLINE REEL ATTACHABLE TO A TRAILER HITCH RECEPTACLE

FIELD OF THE INVENTION

This invention relates to a towline or the like, but more particularly to a towline apparatus which is adaptable to a trailer hitch receptical and includes retraction and locking means.

BACKGROUND OF THE INVENTION

In the past there have been attempts to provide a towline, or the like, which can be attached to a vehicle such as U.S. Pat. Nos. #4,635,953 and #3,881,751 wherein they teach a towline or cable which is attached "permanently" to a vehicle. These devices are functional for their purpose however it is desirous to provide a towline which can be attached or removed easily and is adapted to cooperate with a slider trailer hitch receptical and also provides retraction and locking means. The present invention satisfies this need as well as addresses inherent problems in the prior art as will be seen.

SUMMARY

It is therefore a primary object of the present invention to provide a towline which cooperates with a prior art slider receptical trailer hitch.

A further object is to provide a towline which provides for automatic retrieval of the towline so as to take up slack in the line.

Yet another object is to provide a towline with a stop or locking means, which allows the user to extend the line to a desired length, and lock it into position, therefore the user can connect the line and retraction will not resume until the towline is connected and the locking means disengaged.

Still another object is to provide the towline with a compact housing which allows the towline to return to a stored condition upon completion of the towing process.

Still another object is to provide the towline with an attachment means such as a handle or hook so as to allow the user to easily pull and connect the towline.

Also another object is to provide a towline which is easily portable and compact.

Yet another object is to provide a towline which includes a method whereby, the user can (1) easily connect the towline to a trailer hitch receptical, (2) pull the towline to the required length, (3) lock the line in place, (4) attach the line, (5) apply tension which in turn initiates the retraction mechanism, and (6) allows the user to tow the object to it's desired location.

Other objects and advantages will become apparent when taken into consideration with the following drawings and specifications.

BRIEF DESCRIPTION OF THE DRAWINGS

FIG. 1 is a perspective view of the device ready to be engaged into a prior art slider hitch receptical.

FIG. 2 is a partial cut-a-way side view.

FIG. 3 is a partial cut-a-way side view taken from the opposite side of FIG. 2.

FIG. 7 is a partial perspective view of a second embodiment showing the slider shaft being pivotable about it's horizontal axis.

FIG. 8 is a section taken at 8—8 of FIG. 7.

FIG. 9 is an end view of FIG. 7.

FIG. 10 is a partial cut-a-way top view.

DETAILED DESCRIPTION OF THE DRAWINGS

Figure 5:
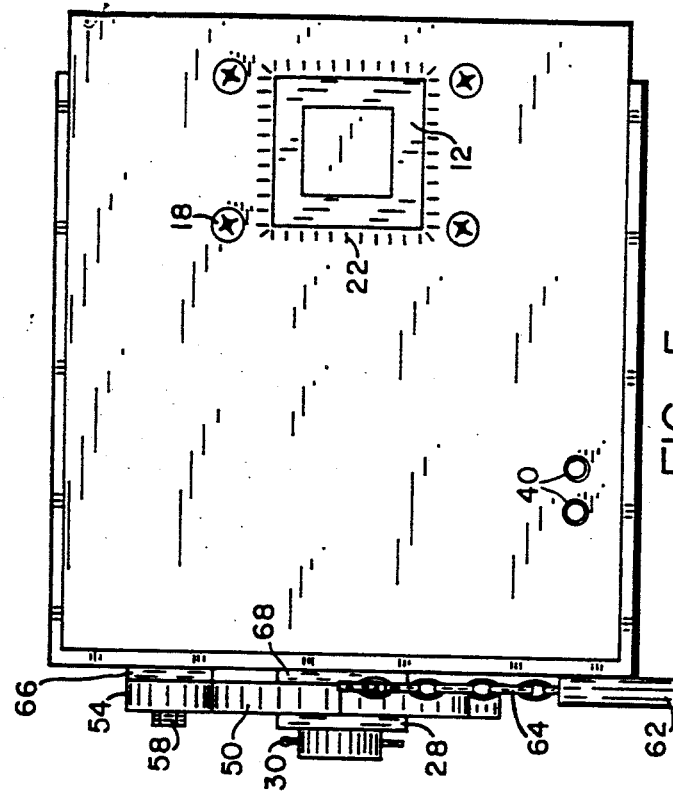
FIG. 5 is an end view taken on the slider shaft side.
Figure 6:
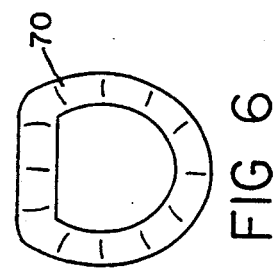
FIG. 6 is a side view of a fastening ring.
Figure 4:
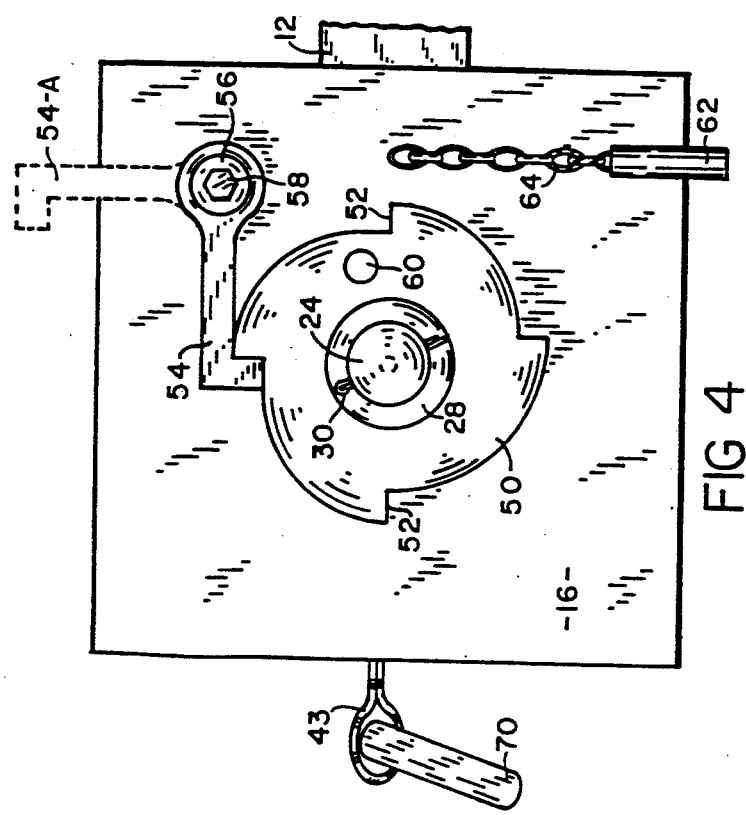
FIG. 4 is a side view of the distal side of FIG. 1.

Referring now in detail to the drawings wherein like characters refer to like elements throughout the various drawings, 10 is an overview of the apparatus while 12 is a square slider shaft made of steel which cooperates with a prior art receiver hitch (not shown) with 14 being a traverse hole cooperating with a corresponding traverse hole in the prior art receiver (not shown) through which a pin 15 or bolt may be inserted, pin 15 includes a hole 17 which is of a shape and size to accept retaining pin 19, (bolt not shown) to securely, removably affix the apparatus to the prior art receiver. 16 is a container or box-like housing having four walls, a top and a bottom which is preferably made from steel plates suitably affixed together by bolts 18 or welding with one of the walls 20 acting as a support for shaft 12 which is suitably affixed to wall 20 by means such as welding 22. Two of the opposite walls of housing 16 act as support members for mounting means for steel shaft 24 as shown in FIG. 4 and shaft 24 is suitably journaled by bearings (not shown) in these opposite supporting walls with 26 being a cover plate for one of the ends of shaft 24 while the distal end of shaft 24 protrudes outside the housing as shown in FIG. 4 and is retained in place by washer 28 and cotter-key 30. Shaft 24 also supports the coil spring 32, shown in FIG. 3 and 10, which has it's inside coil 34 anchored to shaft 24 by suitable means such as bolt 36 with it's distal end 38 being anchored internally to the housing 16 by bolts 40 and washer 42. In FIG. 2 and 10 a flexible tow strap 43 preferably made of webbing is also affixed to shaft 24 at the end of it's inner coil 44 by suitable means such as slot 46 and bolt 48 and the strap made of webbing extending thru a slot 41 of the wall of the housing which is opposite the wall affixed to the attachment member with the slot 41 being of a size and shape to allow the strap to slide thru.

Shaft 24 also supports a substantially round rachet member 50 suitably attached, such as by a spleen (not shown) to shaft 24, with multiple notches or stops 52 which cooperate with a substantially L-shaped member 54 suitably mounted to housing 16 by bolt 58 and washer 56 in a loose fitting relationship to allow L-shaped member to have first and second position, the first position being in a locked relationship with rachet member 50 and the second position being in an unlocked position as shown by the ghost lines 54-A. 60 is a hole in rachet member 50 which registers with a similar hole (not shown) in housing 16 through which pin 62 may be inserted to lock up the apparatus when desired. Pin 62 is affixed to a holding chain 64 which is affixed at it's distal end to housing by means such as welding. 66 and 68 respectively, are spacers to provide a working clearance for rachet member 50 and L-shaped member 54. 70 is an attachment ring for attachment to the work load (not shown) to be towed.

In FIGS. 7, 8 and 9 an added feature is shown which may be used to allow the apparatus to swivel in a horizontal plane by providing top and bottom plates 72 and 74 respectively, which are suitably affixed to a section of shaft 12 such as by welding 76 and their opposite ends being hinged to shaft 12 by pin 78 and cotter-key 80, thus forming a working hinge.

It will now be seen that we have provided a new and unusual towing apparatus which may be inserted into the receiver of a prior art hitch and which may be attached to an object such as a second automobile by a strap and ring and which may be locked in place or allowed to retract by a spring mechanism or may be allowed to automatically lock itself in stages by a rachet arrangement.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A towline apparatus adapted to be detachably connected to a steel square, tubular receiver mounted to a frame of a towing vehicle comprising; a connection member having first and second ends, means to removably fasten said first end of said connection member within said tubular receiver, said connection member having pivotable means between said first and second ends, said pivotable means including said connection member being divided into a first and second section, said first section having a top and bottom plate extending beyond the end opposite the vehicle mounting end, said top and bottom plates having matching vertical bores thru their extended ends, said second section having a vertical bore, a pin, said pin being of a size and shape to be inserted thru said bores of said top and bottom plates and said bore of said second section to form a working hinge, a housing, said housing having four walls, a top and a bottom, means to affix one of said walls to an end of said connection member, a shaft, said shaft being journaled between two of said walls which are at substantially a 90 degree angle to said wall connected to said connection member, a flat spring having multiple coils, said spring having the end of it's inner coil affixed to said shaft, said spring having the end of it's outer coil affixed to one of said four walls, a flexible tow strap, said strap having one of it's ends affixed to said shaft, said strap having it's opposite end affixed to an attachment member, said wall of said housing which is opposite said wall affixed to said connection member having a slot, said attachment member being of a size and shape larger than said slot, said slot being of a size and shape to allow said strap to slide thru, said strap and said flat spring having a first and second position, said first position being with said coiled spring and said strap being in a tensioned coiled position within said housing around said shaft, said second position being with said coiled spring being in a tightened, tensioned position within said housing and said strap being in an extended position outside of said housing whereby, when said strap is pulled from said housing to its said second position and said attachment member on said strap is suitably attached to an object to be towed, said attachment member, said strap, said shaft, said spring, said housing and said connection member cooperate together to provide a towline apparatus which keeps said strap in a tensioned relationship between said towing vehicle and said object to be towed.

* * * * *